US007636730B2

(12) United States Patent
Sanfilippo et al.

(10) Patent No.: US 7,636,730 B2
(45) Date of Patent: Dec. 22, 2009

(54) DOCUMENT CLUSTERING METHODS, DOCUMENT CLUSTER LABEL DISAMBIGUATION METHODS, DOCUMENT CLUSTERING APPARATUSES, AND ARTICLES OF MANUFACTURE

(75) Inventors: Antonio Sanfilippo, Richland, WA (US); Augustin J. Calapristi, West Richland, WA (US); Vernon L. Crow, Richland, WA (US); Elizabeth G. Hetzler, Kennewick, WA (US); Alan E. Turner, Kennewick, WA (US)

(73) Assignee: Battelle Memorial Research, Richland, WA (US)

( * ) Notice: Subject to any disclaimer, the term of this patent is extended or adjusted under 35 U.S.C. 154(b) by 570 days.

(21) Appl. No.: 11/118,156

(22) Filed: Apr. 29, 2005

(65) Prior Publication Data

US 2006/0248053 A1 Nov. 2, 2006

(51) Int. Cl.
G06F 7/00 (2006.01)
G06F 17/30 (2006.01)
(52) U.S. Cl. ..................... 707/102; 707/101
(58) Field of Classification Search ............... None
See application file for complete search history.

(56) References Cited

U.S. PATENT DOCUMENTS

| | | | | | |
|---|---|---|---|---|---|
| 5,963,940 | A | * | 10/1999 | Liddy et al. ............. | 707/5 |
| 6,026,388 | A | * | 2/2000 | Liddy et al. ............. | 707/1 |
| 6,167,368 | A | | 12/2000 | Wacholder | |
| 6,298,174 | B1 | | 10/2001 | Lantrip et al. | |
| 6,484,168 | B1 | | 11/2002 | Pennock et al. | |
| 6,584,220 | B2 | | 6/2003 | Lantrip et al. | |
| 6,684,205 | B1 | * | 1/2004 | Modha et al. ............. | 707/3 |
| 6,772,170 | B2 | | 8/2004 | Pennock et al. | |
| 7,143,091 | B2 | * | 11/2006 | Charnock et al. ......... | 707/5 |
| 2006/0248053 | A1 | * | 11/2006 | Sanfilippo et al. ......... | 707/3 |
| 2007/0098266 | A1 | * | 5/2007 | Chiu et al. ............. | 382/224 |

OTHER PUBLICATIONS

Nirkhi et al., "Optimization of Context Disambiguation in Web Wearch Results", Proceedings of the 2008 International Conference on Computer Science and Information Technology, pp. 820-824, 2008, IEEE.*
Hirst, G. And D. St-Onge; 1998; "Lexical Chains As Representations Of Context For The Detection And Correction Of Malapropisms"; In Fellbaum; 1998; pp. 305-332.
Leacock, C. And M. Chodorow; 1998; *WordNet: an Electronic Lexical Database*, "Combining Local Context And WordNet Similarity For Word Sense Identification"; Chp. 11, (ed. Fellbaum), 1998, pp. 265-283.

(Continued)

*Primary Examiner*—Neveen Abel Jalil
*Assistant Examiner*—Michael J Hicks
(74) *Attorney, Agent, or Firm*—Wells St. John, P.S.

(57) ABSTRACT

Document clustering methods, document cluster label disambiguation methods, document clustering apparatuses, and articles of manufacture are described. In one aspect, a document clustering method includes providing a document set comprising a plurality of documents, providing a cluster comprising a subset of the documents of the document set, using a plurality of terms of the documents, providing a cluster label indicative of subject matter content of the documents of the cluster, wherein the cluster label comprises a plurality of word senses, and selecting one of the word senses of the cluster label.

39 Claims, 3 Drawing Sheets

OTHER PUBLICATIONS

Miller, G. And W. Charles; 1991; "Contextual Correlates Of Semantic Similarity"; *Language And Cognitive Processes*; 6(1): pp. 1-28.

Philip Resnik; 1995; "Using Information Content To Evaluate Semantic Similarity in a Taxonomy"; In *Proceedings Of The 14th International Joint Conference On Artificial Intelligence*, pp. 448-453, Montreal.

Benassis, R. Et al.; "TUCUXI: the InTelligent Hunter Agent for Concept Understanding and LeXical Chalning"; Proceedings of IEEE/WIC/ACM Int'l Conf. On Web Intelligence; Sep. 2004; 8 pp.

Baskaran Sankaran, Vaidehi V.; "Role of Collocations and Case-Markers in Word Sense Disambiguation: A Clustering-Based Approach"; IEEE 2002 Int'l Conf. On Systems, Man and Cybernetics; Oct. 2002; 6 pp.

Agirre, E. And G. Rigau; 1996; "Word Sense Disambiguation Using Conceptual Density"; In *Proceedings Of The 16th International Conference On Computational Linguistics*, pp. 16-22, Copenhagen.

Budanitsky, A And Hirst G, 2001; "Semantic Distance in WordNet: An Experimental, Application-Oriented Evaluation Of Five Measures"; *Workshop On WordNet And Other Lexical Resources, Second Meeting Of The North American Chapter Of The Association For Computational Linguistics*, Pittsburgh.

Gale, W., K. Church, and D. Yarowsky; 1992; "One Sense Per Discourse"; In *Proceedings of the 4th Darpa Speech And Natural Language Workshop*, pp. 233-237.

Jiang, J. And D. Conrath; 1997; "Semantic Similarity Based On Corpus Statistics And Lexical Taxonomy"; In Proceedings of International Conference On Research In Computation Linguistics, Taiwan.

Leacock, C. And M. Chodorow; 1998; "Combining Local Context And WordNet Similarity For Word Sense Identification"; in Fellbaum, 1998, pp. 265-283.

Lin, D.; 1998; "An Information-Theoretic Definition of Similarity"; In *Proceedings Of The 15th International Conference On Machine Learning*; Madison WI.

Herbert Rubenstein And John B. Goodenough; 1965; "Computational Linguistics" "Contextual Correlates Of Synonymy"; *Communications Of The ACM*; 8(10): 627-633.

Michael Sussna: 1993; "Word Sense Disambiguation For Free-Text Indexing Using A Massive Semantic Network"; In *Proceedings Of The Second International Conference On Information And Knowledge Management* (CIKM-93) pp. 67-74, Arlington VA.

Wise, J.A.; J.J. Thomas, et al.; 1995; "Visualizing The Non-Visual: Spatial Analysis And Interaction With Information From Text Documents"; *IEEE Information Visualization*; IEEE Press, Los Alamitos CA; 14 pp.

WordNet (http://www.cogsci.princeton.edu/~wn); Dec. 3, 2004; 2 pp.

R. Rada, M. Hafedh, E. Bicknell and M. Blettner, 1989 Development and Application of a Metric on Semantic Nets, IEEE Transactions on System, Man, and Cybernetics, 19(1):17-30).

http://www.d.umn.edu/~tpederse/similarity.html; Dec. 3, 2004; 1 pp.

http://wwww.cs.unt.edu/~rada/downloads.html; Software and data Sets; Rada; Apr. 25, 2005; 4 pp.

http://groups.yahoo.com/group/wn-similarity; 2004; 2 pp.

http://search.cpan.org/dist/WordNet-Similarity; Dec. 3, 2004; 2 pp.

http://search.cpan.org/src/TPEDERSE/WordNet-Similarity-0.12/README; Dec. 3, 2004; 4 pp.

http://search.cpan.org/src/TPEDERSE/WordNet-Similarity-0.12/CHANGES Dec. 3, 2004; 14 pp.

http://search.cpan.org/dist/WordNet-Similarity/doc/todo.pod; Dec. 3, 2004; 3 pp.

http://search.cpan.org/dist/WordNet-QueryData Dec. 3, 2004; 1 pp.

U.S. Appl. No. 10/602,802, filed Jun. 24, 2003, Thomas et al.

"International Preliminary Report on Patentability and Written Opinion of Searching Authority"; S/N: PCT/US2006/012791; mailed Nov. 8, 2007; 8 pp.

\* cited by examiner

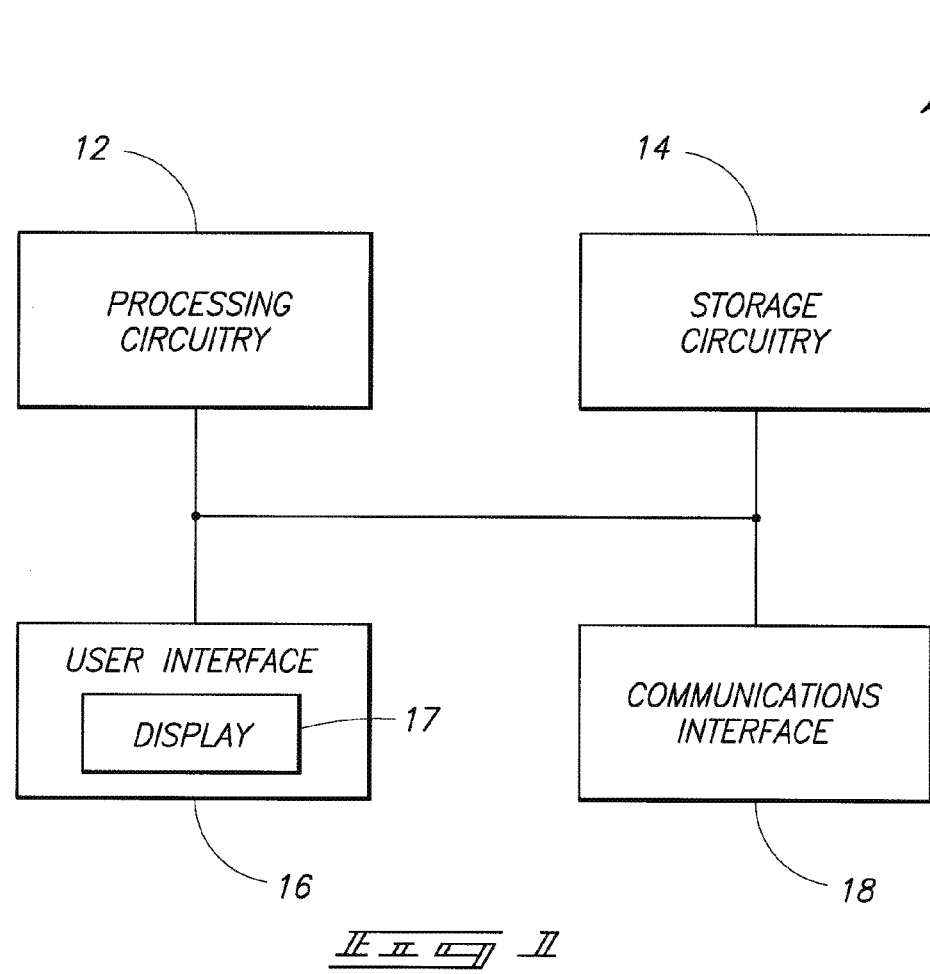
_F I G 1_
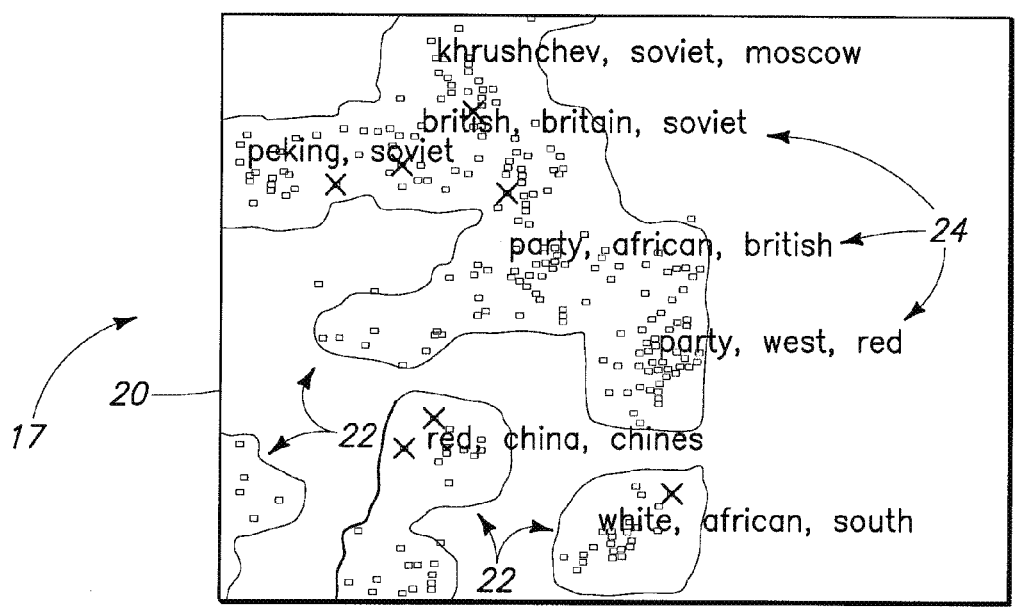
_F I G 2_

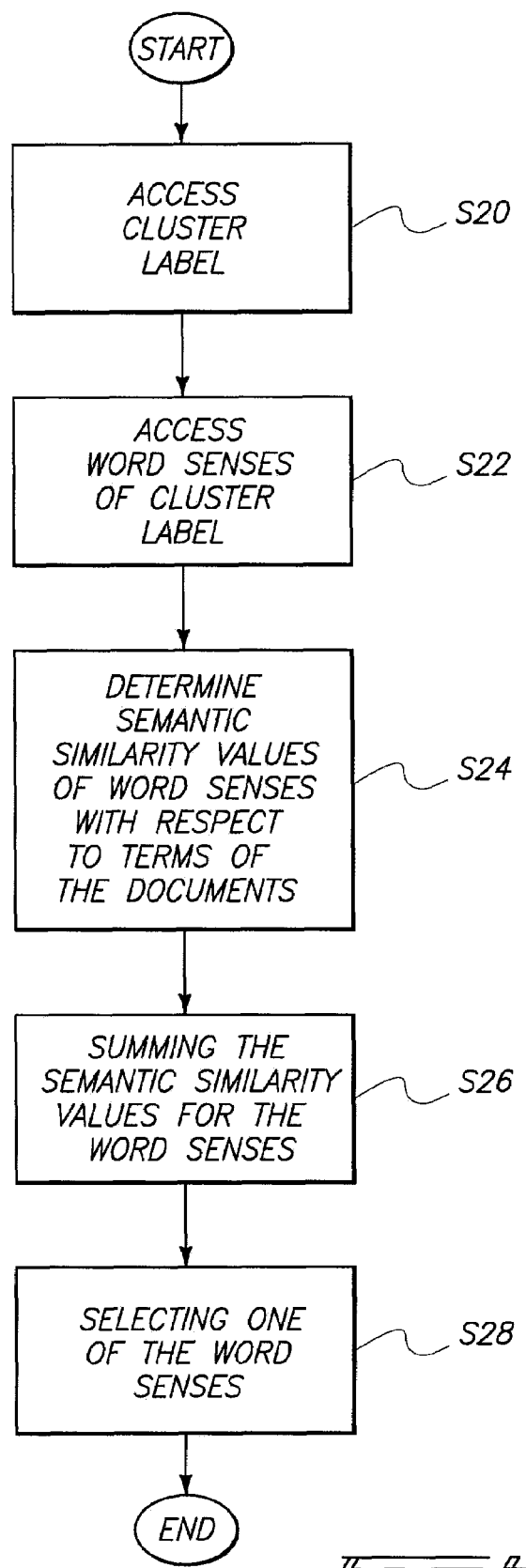

DOCUMENT CLUSTERING METHODS, DOCUMENT CLUSTER LABEL DISAMBIGUATION METHODS, DOCUMENT CLUSTERING APPARATUSES, AND ARTICLES OF MANUFACTURE

STATEMENT OF GOVERNMENT RIGHTS

This invention was made with Government support under contract DE-AC0676RLO1830 awarded by the U.S. Department of Energy. The Government has certain rights in the invention.

TECHNICAL FIELD

This disclosure relates to document clustering methods, document cluster label disambiguation methods, document clustering apparatuses, and articles of manufacture.

BACKGROUND OF THE DISCLOSURE

The volume of electronic information generated and available has rapidly increased with advancements in electronics including digital processing, communications and storage. There have also been improvements to assist with analysis and retrieval of electronic data from databases or other data compilations. For example, systems and methods for enabling document clustering have been introduced to assist with analysis of relatively substantial collections of documents. These systems and methods generate clusters which include documents which are related in some way to one another. For example, the documents of the document collection may be analyzed and documents which have certain terms may be considered to be related to one another and may be provided into the same cluster. Clustering may be implemented by filtering the documents of the collection according to the frequency of occurrence of terms in documents of the collection, topics of the documents, overlap of subject matter of the documents and/or other criteria.

One of the long standing issues in document clustering concerns the identification of a meaning of the cluster. In one approach, prominent terms within each cluster are identified and selected. These prominent terms may be presented to the user as labels which attempt to generally provide an indication of semantic content for each cluster as a whole.

In general, cluster labels can be helpful in clarifying the meaning of clusters. However, the utility of a cluster label is severely limited when the word it represents is polysemous. For example, WordNet (located at www.cogsci.princeton.edu/~wn) gives 33 senses for the word "drive": 12 as a noun and 21 as a verb. A user may be able to select the correct sense for a cluster label such as "drive" by comparison with the remaining labels in the cluster and direct inspection of the cluster file(s) in which the label occurs. However, such analysis is time consuming and users may not have the time or disposition to carry out meaning discovery tasks. Moreover, manual inspection is of no avail in situations where a machine, rather than a person, needs to have the correct meaning for the cluster label. These situations are typically present when document clustering is done within a language unknown to the user and cluster labels have to be automatically translated to provide the user with an indication as to whether a given cluster may be of interest. When cluster labels are translated from the unknown language to the language of the user, polysemus words will most likely have several different translations and establishing what the cluster is about with a reasonable degree of certainty may be nearly impossible.

At least some aspects of the disclosure provide methods and apparatus for disambiguating labels of document clusters.

BRIEF DESCRIPTION OF THE DRAWINGS

Exemplary embodiments of the disclosure are described below with reference to the following accompanying drawings.

FIG. 1 is a functional block diagram of a document clustering apparatus according to one embodiment.

FIG. 3 is a flow chart of an exemplary methodology for implementing document clustering according to one embodiment.

FIG. 4 is a flow chart of an exemplary methodology for disambiguating cluster labels according to one embodiment.

DETAILED DESCRIPTION OF THE PREFERRED EMBODIMENTS

Figure 2:
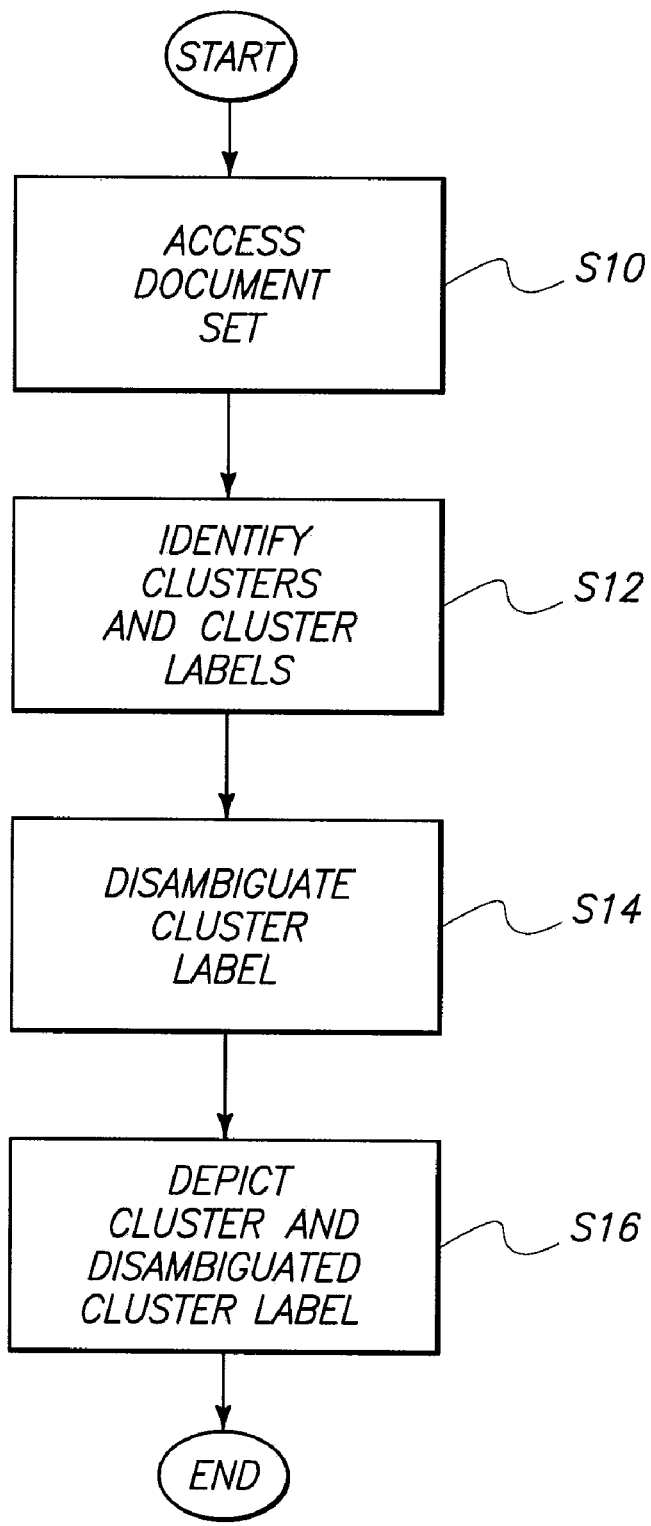
FIG. 2 is a screen display of a plurality of clusters and cluster labels depicted according to one embodiment.

According to one aspect of the disclosure, a document clustering method comprises providing a document set comprising a plurality of documents, providing a cluster comprising a subset of the documents of the document set, using a plurality of terms of the documents, providing a cluster label indicative of subject matter content of the documents of the cluster, wherein the cluster label comprises a plurality of word senses, and selecting one of the word senses of the cluster label.

According to another aspect of the disclosure, a document cluster label disambiguation method comprises providing a cluster label for a cluster comprising a subset of a plurality of documents of a document set, wherein the cluster label comprises one of a plurality of terms common to at least some of the documents of the cluster and the cluster label comprises a plurality of word senses, determining, for individual ones of the word senses, a plurality of semantic similarity values for respective ones of the terms, wherein the semantic similarity values are individually indicative of a degree of semantic similarity between one of the word senses and one of the terms, analyzing the semantic similarity values determined for respective ones of the word senses, and selecting one of the word senses responsive to the analyzing.

According to yet another aspect of the disclosure, a document clustering apparatus comprises processing circuitry configured to access a document set comprising a plurality of documents, to define a cluster comprising a subset of the documents of the document set, to identify a cluster label indicative of subject matter content of at least one of the documents of the cluster, and to disambiguate the cluster label after the identification of the cluster label to increase the relevancy of the cluster label with respect to the subject matter content of the at least one of the documents compared with the cluster label prior to the disambiguation.

According to an additional aspect of the disclosure, an article of manufacture comprises media comprising programming configured to cause processing circuitry to access a cluster label for a cluster comprising a subset of a plurality of documents of a document set, wherein the cluster label comprises one of a plurality of terms common to at least one of the documents of the cluster and the cluster label comprises a plurality of word senses, determine, for individual ones of the word senses, a plurality of semantic similarity values for respective ones of the terms, wherein the semantic similarity values are individually indicative of a degree of semantic similarity between one of the word senses and one of the terms, analyze the semantic similarity values determined for respective ones of the word senses, and select one of the word senses responsive to the analysis.

Exemplary aspects of the disclosure are directed towards disambiguation of cluster labels, for example, including polysemus words. In one embodiment, semantic similarity may be used to assign word senses (e.g., WordNet) to polysemus cluster labels to more directly inform the intended meaning of the words. According to some of the embodiments of the disclosure, word senses may be assigned to cluster labels to disambiguate the cluster labels provided by document clustering apparatus and methods. Aspects of the disclosure illustrate how document clustering can provide a basis for developing approaches to word sense disambiguation.

Referring to FIG. 1, a document clustering apparatus 10 is depicted in accordance with one exemplary embodiment. The exemplary document clustering apparatus 10 includes processing circuitry 12, storage circuitry 14, a user interface 16, and a communications interface 18. Additional components (e.g., print engine) may be provided although not depicted in FIG. 1. In addition, other configurations of apparatus 10 may comprise alternative and/or less components in other embodiments.

In one embodiment, processing circuitry 12 is arranged to process data, control data access and storage, issue commands, and control other desired operations of apparatus 10. As described further below, processing circuitry 12 may be configured to implement operations with respect to document clustering and disambiguation of cluster labels of the clusters.

Processing circuitry 12 may comprise circuitry configured to implement desired programming provided by appropriate media in at least one embodiment. For example, the processing circuitry 12 may be implemented as one or more of a processor and/or other structure configured to execute executable instructions including, for example, software and/or firmware instructions, and/or hardware circuitry. Exemplary embodiments of processing circuitry include hardware logic, PGA, FPGA, ASIC, state machines, and/or other structures alone or in combination with a processor. These examples of processing circuitry 12 are for illustration and other configurations are possible.

Storage circuitry 14 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry 12 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

User interface 16 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface may include a display 17 (e.g., cathode ray tube, LCD, etc.) configured to depict visual information and an audio system (not shown) as well as a keyboard, mouse and/or other input device (not shown). Any other suitable apparatus for interacting with a user may also be utilized.

Communications interface 18 is configured to implement bi-directional communications with respect to devices external of apparatus 10 and may be implemented as a network connection in one embodiment.

Document clustering is an organizational technique for arranging a collection of documents in a manner which may facilitate access by a user. The collection of documents may be accessed and analyzed by processing circuitry 12 in an attempt to arrange the documents which are related to one another in clusters. Accordingly, an exemplary cluster comprises a subset of documents of the collection. Apparatus 10 may analyze documents of the document set to identify terms common to a subset of documents of the collection. For example, apparatus 10 implementing document clustering techniques may analyze the frequency of use of terms in the documents, topics of the documents, and/or overlap of subject matter of the documents to arrange the documents into clusters in some embodiments. Aspects of document clustering according to exemplary clustering tool embodiments are described in Wise, J. A.; J. J. Thomas, et al.; 1995, "Visualizing The Non-Visual: Spatial Analysis And Interaction With Information From Text Documents", *IEEE Information Visualization*; IEEE Press, Los Alamitos, Calif.; and U.S. Pat. No. 6,772,170, assigned to assignee hereof, and the teachings of both references are incorporated herein by reference.

Referring to FIG. 2, an exemplary screen display 17 of display 16 is shown illustrating an exemplary output screen resulting from document clustering analysis of a sample collection of documents which may also be referred to as a document set, for example, provided in a database which may be accessed using communications interface 18, stored using storage circuitry 14, or otherwise accessed by processing circuitry 12.

The screen display 17 illustrates clusters 22 arranged upon the screen with associated cluster labels 24 which are generally indicative of the subject matter content of the documents of respective clusters 22. Cluster labels 24 are associated with salient terms within respective clusters 22. For example, the cluster labels 24 are selected from terms contained within the documents of the clusters 22 in one implementation.

In one embodiment, cluster labels 24 are selected from a plurality of major terms (e.g., 200 relatively unique terms frequently occurring in at least some of the documents) which are used as vector features for cluster modeling of the above-mentioned Wise reference. The prominence of the major terms is calibrated through their co-occurrence with, or lack thereof, of a plurality of minor terms (e.g., 2000 terms also occurring in at least some of the documents). A major term may be a member of a statistically determined set of words used to classify documents according to their content. A minor term may be a word that, by virtue of its co-occurrence in documents with a major term, implies the meaning of the major term. Accordingly, in at least one embodiment, a plurality of terms occurring in at least some of the documents of the collection may be used to define a cluster including plural documents, at least some of which include overlapping terms.

Accordingly, in at least one embodiment, cluster labels 24 are associated with a number of minor terms and the cluster labels 24 co-occur in at least some of the documents which populate the respective clusters 22. Table A illustrates an exemplary table showing an association of cluster labels and minor terms for a cluster 22. For individual clusters 22 generated by document clustering apparatus 10, a cluster identification may be provided, one or more cluster label, and a plurality of minor terms which are co-occurring with the cluster label(s) in at least some of the documents of the respective cluster 22.

TABLE A

| Cluster ID | 1 |
|---|---|
| Cluster label | tissue |
| Minor Terms found with cluster label | body, cell, color, contain, cut, green, liver, normal, result, section, stain, study, wall, white |

Document clustering apparatus 10 may generate cluster label records for individual clusters 22, and in one embodiment, may include the cluster identification, cluster label, a rate of occurrence of the cluster label in the cluster, filenames of documents within the cluster, individual minor terms found in association with the cluster label, and rates of occurrence of individual ones of the minor terms within the respective cluster. In the described embodiment, document clustering apparatus 10 may be configured using a plurality of thresholds which control clustering operations. Exemplary thresholds set respective criteria and may include specification of a minimum number of documents (e.g., five) per cluster, a number of documents (e.g., three) of the cluster in which a term occurs before it may be considered as a candidate as a cluster label, and/or the number of documents (e.g., three) of the cluster in which a term co-occurs with a cluster label for qualification as a minor term. The above exemplary parameter values were found to offer an appropriate balance between an amount of data considered for experiment and the satisfaction level of the results. Other thresholds or values may be used in other embodiments.

As mentioned above, some cluster labels may be polysemus (i.e., have a plurality of word senses) and ambiguous to some extent. According to at least some aspects of the disclosure, document clustering apparatus 10 may perform processing in an effort to disambiguate the cluster labels wherein the resultant disambiguated cluster labels have an increased relevancy with respect to the subject matter contents of the documents of the respective cluster compared with the relevancy provided by the initial cluster labels. In one exemplary embodiment, document clustering apparatus 10 may, for a polysemus cluster label, attempt to identify one of the word senses of the cluster label having the highest similarity (e.g., semantic) to the minor terms with which it co-occurs in an effort to identify the prominent word sense for the cluster label.

For each of the cluster label records, document clustering apparatus 10 may create a disambiguation hypothesis construct including a set of semantic similarity record structures for co-occurring minor terms (i.e., minor terms which occur in the same documents of the cluster as the cluster label) according to one embodiment. An exemplary disambiguation hypothesis construct may include the cluster label word and co-occurring minor term, the part of speech appropriate to contexts of occurrence of the cluster and minor terms in the cluster, the sense (e.g., WordNet) assigned to the cluster label, a semantic similarity score, and the reference file names including the documents present within the respective cluster 22. An example of a disambiguation hypothesis construct is shown in Table B.

TABLE B

| Cluster ID | | 1 | |
|---|---|---|---|
| Disambiguation Hypothesis | tissue#n#1 | cell#n#2 | 0.073 |
| | tissue#n#1 | cell#n#1 | 0.072 |
| | tissue#n#2 | cell#n#2 | 0.058 |
| | tissue#n#2 | cell#n#1 | 0.057 |
| | tissue#n#1 | cell#n#3 | 0.057 |
| | tissue#n#1 | cell#n#4 | 0.050 |
| | tissue#n#2 | cell#n#3 | 0.047 |
| | tissue#n#2 | cell#n#4 | 0.043 |
| | tissue#n#1 | liver#n#1 | 0.114 |
| | tissue#n#2 | liver#n#2 | 0.061 |
| | tissue#n#1 | liver#n#2 | 0.055 |
| | tissue#n#2 | liver#n#1 | 0.052 |
| | ... | ... | ... |
| Filenames | br-j08, br-j12, br-j14, br-j17, br-j18, br-j70 | | |

Aspects of exemplary disambiguation as illustrated by Table B include deriving semantic similarity values or scores for pairs of cluster labels and co-occurring minor terms (i.e., the values are shown in the rightmost column of Table B). A plurality of approaches for obtaining semantic similarity may be of particular interest for disambiguation purposes and include analytic and hybrid exemplary approaches in exemplary implementations. These exemplary approaches utilize, in different degrees, specific properties of a semantic network such as WordNet (located at www.cogsci.princeton. edu/~wn). Analytic approaches utilize structural and content properties of a semantic network and vary from relatively straightforward techniques such as edge count (R. Rada, M. Hafedh, E. Bicknell and M. Blettner, 1989, Development and Application of a Metric on Semantic Nets, IEEE Transactions on System, Man, and Cybernetics, 19(1):17-30), the teachings of which are incorporated by reference herein, to more refined methods that include leverage such as a link direction (Hirst, G. and D. St-Onge; 1998; "Lexical Chains As Representations Of Context For The Detection And Correction Of Malapropisms"; In Fellbaum; 1998; pp. 305-332), relative depth (Michael Sussna; 1993; "Word Sense Disambiguation For Free-Text Indexing Using A Massive Semantic Network"; In *Proceedings Of The Second International Conference On Information And Knowledge Management (CIKM-93)* Pages 67-74, Arlington Va.; and Leacock, C. and M. Chodorow; 1998; "Combining Local Context And WordNet Similarity For Word Sense Identification"; In Fellbaum, 1998, pp. 265-283) and/or network density (Agirre, F. And G. Rigau; 1996; "Word Sense Disambiguation Using Conceptual Density"; In *Proceedings Of The 16th International Conference On Computational Linguistics*, pp. 16-22, Copenhagen), the teachings of all of which are incorporated by reference herein. Hybrid approaches use information theoretic measures derived from corpus statistics in combination with hierarchical structure and word sense partitioning of a semantic network. For example, Philip Resnik; 1995; "Using Information Content To Evaluate Semantic Similarity"; In *Proceedings Of The 14th International Joint Conference On Artificial Intelligence*, Pages 448-453, Montreal, the teachings of which are incorporated by reference herein, defines semantic similarity between two Word Net synonym sets (c1, c2) as the information content of the least shared common superordinate synonym set (1 scs) of sets c1, c2 as shown in Eqn (1) where p(c) is the probability of encountering instances of a synonym c in a specific corpus.

$$sim(c1,c2) = -\log p(1scs(c1,c2)) \qquad \text{Eqn (1)}$$

The reference, Jiang, J. and D. Conrath; 1997; "Semantic Similarity Based On Corpus Statistics And Lexical Taxonomy"; In Proceedings Of International Conference On Research In Computation Linguistics, Taiwan, the teachings of which are incorporated by reference herein, provide a refinement of Resnik's measure that factors in the relative distance from a synonym set to a least common shared superordinate by calculating the conditional probability of encountering instances of the subordinate synonym set in a corpus given the parent synonym set as shown by Eqn (2):

$$sim(c1,c2)=2*\log p(1scs(c1,c2))-(\log p(c1)+\log p(c2)) \quad \text{Eqn (2)}$$

Lin, D.; 1998; "An Information-Theoretic Definition Of Similarity"; In *Proceedings Of The 15th International Conference On Machine Learning*; Madison Wis., the teachings of which are incorporated by reference herein introduces a slight modification to Jiang and Conrath's measure as shown by Eqn (3):

$$sim(c1,c2)=2*\log p(1scs(c1,c2))/(\log p(c1)+\log p(c2)) \quad \text{Eqn (3)}$$

Overall, Jiang and Conrath's measure seems to outperform other approaches. For example, Budanitsky, A and Hirst G, 2001; "Semantic Distance In WordNet: An Experimental, Application-Oriented Evaluation Of Five Measures"; *Workshop On WordNet And Other Lexical Resources, Second Meeting Of The North American Chapter Of The Association For Computational Linguistics*, Pittsburgh, the teachings of which are incorporated by reference herein, report that Jiang and Conrath's measure gave the best results in the task of malapropism detection as compared to Hirst and St.-Onge, Leacock and Chodorow, Resnik or Lin. Referring to Table C, this assessment is corroborated by the coefficients of correlation between the five similarity measures and the human similarity judgments collected by Herbert Rubenstein and John B. Goodenough; 1965; "Contextual Correlates Of Synonymy"; *Communications Of The ACM*"; 8(10): pp. 627-633; and Miller, G. and W. Charles; 1991; "Contextual Correlates Of Semantic Similarity"; *Language And Cognitive Processes*; 6(1): pp. 1-28, the teachings of both of which are incorporated by reference herein, and which Budanitsky and Hirst report in the same study:

TABLE C

Coefficient of correlation between human ratings of similarity (by Miller and Charles, and Rubenstein and Goodenough) and five computational measures. (Adapted from Budanitsky and Hirst, 2001)

| Similarity Measure | M&C | R&G |
|---|---|---|
| Hirst and St-Onge | .744 | .786 |
| Leacock and Chodorow | .816 | .834 |
| Resnik | .774 | .779 |
| Jiang and Conrath | .850 | .781 |
| Lin | .829 | .819 |

According to exemplary aspects of the disclosure, disambiguation hypotheses may be obtained by deriving semantic similarity scores for pairs of cluster labels and co-occurring minor terms using the implementation of Resnik's, Jiang and Conrath's, and Lin's measure made available by a CPAN module that implements a variety of semantic similarity measures that can be used in conjunction with WordNet 1.7.1 as described by Patwardhan and Pedersen at (http://www-.d.umn.edu/~tpederse/similarity.html), the teachings of which are incorporated herein by reference. Results of an exemplary resultant disambiguation hypothesis construct are described with respect to Table B. The cluster labels and minor terms may be provided in dictionary form if a lemmatized corpus is used by document clustering apparatus 10 for clustering. A part of speech tagger and lemmatizer may be used to process inflected cluster labels and minor terms in at least some embodiments.

Referring again to Table B, aspects of exemplary processing of the compiled resulting semantic similarity scores by processing circuitry 12 are described according to one embodiment. According to one exemplary embodiment, document clustering apparatus 10 selects one of the word senses of the cluster label 24 and part of speech having the highest semantic similarity value or score during disambiguation of a cluster label 24. Respective semantic similarity values may be determined using, for example, the above-described semantic comparison processes between different word senses of the cluster label and the minor terms or different word senses of the minor terms. In the example shown in Table B, the values are determined for individual ones of the word senses of the cluster labels with respect to individual ones of the word senses of the minor terms.

The semantic similarity scores are indicative of a degree of semantic similarity between the word senses of the terms being compared. In general, the higher the similarity score between the word senses of the cluster label and its co-occurring minor term, the higher the likelihood that the two words are more indicative of the meaning of the respective cluster. Using semantic similarity according to at least one embodiment, apparatus 10 filters out senses of a cluster label which yield no or low similarity with respect to any of its co-occurring minor terms. In addition, pairs of disambiguation hypotheses where the cluster label has the same sense number may also be discriminated according to at least some aspects. For example, wherein two scores are close or the same, the lower of the sense numbers may be selected which may provide one form of frequency normalization (e.g., wherein lower sense words in WordNet have a higher rate of occurrence). This exemplary described selection will result in the selection of one of a plurality of different word senses of an individual minor term which may more accurately indicate the subject matter content of the documents of the respective cluster.

In accordance with one embodiment, document clustering apparatus 10 initially selects for each minor term (i.e., cell and liver in Table B) the highest similarity score for each word sense of the cluster label (i.e., tissue in Table B). For example, for the minor term "cell," apparatus 10 selects 0.073 for sense 1 and 0.058 for sense 2 and for the minor term "liver," apparatus selects 0.114 for sense 1 and 0.061 for sense 2. If two scores are the same or close for a given minor term, document clustering apparatus 10 may select the score associated with the lower of the senses of the cluster label in one embodiment to achieve the above-described frequency normalization.

Following the selection of the highest scores for each cluster label word sense for each minor term, the scores for respective senses of the cluster label are summed to provide cumulative semantic similarity values. In the described example, the summation would provide 0.187 for sense 1 of the cluster label and 0.119 for sense 2 (i.e., for sense 1: 0.073+0.114=0.187 and for sense 2: 0.058+0.061=0.119 in the example of Table B). The apparatus 10 selects as the disambiguated output for the cluster label the one of the word senses of the cluster label having the greatest or highest cumulative semantic similarity with respect to minor terms in one embodiment. In other embodiments, semantic similarity of the cluster label word senses may be determined with respect to other terms, such as major terms, other labels for the cluster, etc. In the described example, apparatus 10 determines sense 1 as having the greatest cumulative value and sense 1 is selected as the disambiguated cluster label for the respective cluster label.

If no similarity results are available as a result of the semantic similarity analysis of the cluster label with respect to the minor terms, then a default condition may be implemented in one aspect. For example, the cluster label may be assigned sense 1 when the similarity results are inconclusive. In addition, some cluster labels may be unambiguous (e.g., some cluster labels may only include a single sense) and the cluster label may be assigned a high score (e.g., 100) so that the cluster label will remain the same.

Accordingly, in one exemplary disambiguation embodiment, processing circuitry 12 selects for individual ones of the terms (e.g., cell, liver, etc.), the greatest semantic similarity values for each of the plural word senses (e.g., 1, 2, 3, etc.) of the cluster label. The semantic similarity values are summed for respective ones of the word senses of the cluster label providing a plurality of cumulative semantic similarity values for each of the cluster label word senses and the processing circuitry 12 selects the cluster label word sense having the largest respective cumulative semantic similarity value as the disambiguated cluster label (e.g., sense 1 in the example of Table B).

In accordance with the example described with respect to Table B, the processing circuitry 12 may determine for individual one of the cluster label word senses (e.g., tissue#n#1), a plurality of semantic similarity values with respect to a plurality of word senses of individual ones of the terms (e.g., tissue#n#1 cell#n#1, tissue#n#1 cell#n#2, etc.). In other embodiments, processing circuitry 12 may determine the semantic similarity values of the cluster label word senses with respect to the terms themselves (i.e., not the word senses of the terms).

Filtering operations may also occur during the semantic similarity analysis. For example, Table B illustrates values which exceeded a similarity threshold. Similarity values of word senses of the cluster label with respect to minor terms may be removed if an exemplary threshold is not exceeded by the values in one embodiment (e.g., an example of such a threshold might be a real number lower than 0.04).

Following identification of the appropriate word senses of the cluster labels 24, document clustering apparatus 10 may alter cluster labels 24 on the screen display 20 to indicate the respective determined word senses. In additional embodiments, document clustering apparatus 10 or other entity may implement translation operations of the cluster labels 24 from one language to another. Word sense information for respective ones of the cluster labels may be accessed by apparatus 10 or other translation entity to provide a translated cluster label of increased accuracy with respect to the subject matter content of the documents of the respective cluster 22.

According to one embodiment, the document clustering apparatus 10 may provide the cluster label disambiguation as a disambiguated cluster label record for each of the cluster labels being analyzed. Referring to the example of Table C, the disambiguated cluster label record includes the respective cluster identification, the disambiguated cluster label (e.g., including word sense number and part of speech in one example including a polysemus cluster label) for the ambiguous cluster label (e.g., "tissue"), and all files of documents present within the respective cluster.

TABLE D

| | |
|---|---|
| Cluster ID | 1 |
| Disambiguated Cluster Label | tissue#n#1 |
| Filenames | br-j08, br-j12, br-j14, br-j17, br-j18, br-j70 |

Referring to FIG. 3, an exemplary method which may be performed by processing circuitry 12 of document clustering apparatus 10 is shown. Other methods are possible including more, less or alternative steps.

At a step S10, the processing circuitry may access a collection of documents of a document set to be analyzed.

At a step S12, the processing circuitry processes the collection of documents to identify one or more cluster of documents and one or more cluster label for respective ones of the document clusters.

At a step S14, the processing circuitry disambiguates the cluster label to more clearly reflect the subject matter contents of the documents of the respective cluster. In one embodiment, the processing circuitry may identify one of a plurality of word senses of a polysemus cluster label to accomplish the disambiguation. Additional exemplary details of step S14 are described below with respect to FIG. 4 in one embodiment.

At a step S16, the processing circuitry controls a display to depict the cluster and the disambiguated cluster label. According to another aspect, the disambiguated cluster label may be translated to a different language.

Referring to FIG. 4, the processing circuitry 12 of the document clustering apparatus may perform the exemplary depicted method to disambiguate a polysemus cluster label. Other methods are possible including more, less or alternative steps.

At a step S20, the processing circuitry accesses the cluster label of the respective cluster being analyzed.

At a step S22, the processing circuitry accesses a plurality of word senses of the cluster label if the cluster label is polysemus. If the cluster label has a single word sense, the single word sense may be considered as the disambiguated label as discussed above in one embodiment.

At a step S24, the processing circuitry determines semantic similarity values of the word senses with respect to terms of the documents. The semantic similarity values may be determined with respect to the terms or a plurality of word senses of the terms in exemplary embodiments.

At a step S26, the processing circuitry identifies, for each word sense, the highest semantic similarity value with respect to each of the terms, and for each word sense of the cluster label, sums the highest semantic similarity values of the terms for the respective word sense to obtain a cumulative semantic similarity value for the respective word sense.

At a step S28, the processing circuitry selects the word sense of the cluster label having the highest cumulative semantic similarity value as the disambiguated cluster label.

A SemCor document collection was used in one example to analyze above-described exemplary operations of document clustering apparatus 10. SemCor (http://wwww.cs.unt.edu/~rada/downloads.html) contains 352 documents selected from the Brown corpus wherein most content words have been manually tagged with a WordNet sense for accessing results. Disambiguated cluster label records contain information for calculating precision and recall with reference to the original SemCor corpus. To facilitate the evaluation, gold standard records were created from the SemCor corpus consisting of words corresponding to cluster labels with the part of speech and sense number for each file name as shown in Table E.

TABLE E

Cluster_label#filename#POS#sense tissue#br-e23#n#2
tissue#br-e25#n#1
tissue#br-f10#n#1
tissue#br-j08#n#1
tissue#br-j12#n#1
tissue#br-j14#n#1
tissue#br-j15#n#1
tissue#br-j16#n#1
tissue#br-l14#n#2
tissue#br-p12#n#2

The evaluation corpus consisted of 352 SemCor files grouped into 18 clusters. Each cluster had several cluster labels. In one evaluation, cluster labels which were either noun or verbs were focused upon. There were 271 cluster label words which accounted for 181 homographs which are shown in Table E2.

TABLE E2 god#n, feed#v, surface#n, car#n, church#n, gun#n, inch#n, item#n, data#n, treatment#n, temperature#n, game#n, file#v, doctor#n, plant#n, film#n, music#n, employee#n, shot#n, kid#n, dog#n, paint#v, sample#n, plane#n, compute#v, farm#n, industry#n, trial#n, income#n, price#n, measurement#n, planning#n, captain#n, occurrence#n, assistance#n, muscle#n, election#n, pat#v, sex#n, tissue#n, cell#n, patient#n, operator#n, corporation#n, site#n, jew#n, bridge#n, soil#n, negro#n, completion#n, tube#n, wage#v, ratio#n, particle#n, universe#n, jury#n, fraction#n, snow#n, tax#n, vacation#n, membership#n, payment#n, player#n, stain#v, arc#n, drill#v, pool#n, protein#n, baseball#n, catholic#n, protestant#n, file#n, award#v, union#n, boat#n, anxiety#n, plant#v, expenditure#n, communism#n, engine#n, oxygen#n, kid#v, pencil#n, library#n, georgia#n, radiation#n, lord#n, pool#v, christian#n, award#n, fig#n, shelter#n, buzz#v, tax#v, new_england#n, fiscal_year#n, composer#n, spectrum#n, curve#n, sample#v, missile#n, mold#v, wage#n, detective#n, planet#n, driver#n, drug#n, coach#n, clay#n, jazz#n, complement#n, providence#n, alaska#n, papa#n, bridge#v, values#n, nationalism#n, downtown#n, loan#n, atom#n, shooting#n, dancer#n, slavery#n, senate#n, mexican#n, paint#n, sept#n, republican#n, complement#v, snow#v, disk#n, bull#n, railroad#n, constitution#n, stain#n, laos#n, assessment#n, price#v, liberal#n, mayor#n, cuba#n, doctor#v, coach#v, film#v, john#n, jesus_christ#n, pilot#v, jesus#n, rhode_island#n, legislature#n, pa#n, houston#n, ritual#n, buzz#n, registration#n, mold#n, musical#n, toll#n, vacation#v, bull#v, plane#v, chinese#n, soil#v, fallout#n, mary#n, billion#n, loan#v, drug#v, congo#n, farm#v, toll#v, inch#v, disk#v, dean#n, sovereignty#n, rev#v, surface#v, feed#n, pilot#n, shelter#v, curve#v The total number of word sense occurrences in the gold standard for the 271 cluster labels was 791.

Two distinct tests of by-cluster and by-file were performed. The by-cluster test was intended to evaluate the success of the word sense disambiguation with respect to choosing the correct sense for the cluster label. This test determined whether the sense chosen by the apparatus 10 occurred in at least one of the files within the cluster. The by-file test evaluated the success of apparatus 10 in choosing all correct senses for all clusters. This test was more stringent as it determined whether the word sense chosen by apparatus 10 for the cluster label matched all occurrences of the corresponding word and part of speech in the cluster files. Such a condition cannot be obtained unless each cluster is homogenous to a sufficient degree that it does contain different senses of the same word. If one sense per discourse hypothesis as set forth in Gale, W., K. Church, And D. Yarowsky; 1992; "One Sense Per Discourse"; In *Proceedings Of The 4th Darpa Speech And Natural Language Workshop*, pp. 233-237 (the teachings of which are incorporated herein by reference) is regarded as applying to clusters, it may be conjectured that apparatus 10 provides a measure of how successful the clustering task is carried out.

Precision, recall and f-measure were calculated in the usual fashion:

Precision=true positives/true positives+false positives

Recall=true positives/true positives+false negatives $F$-measures=2*precision*recall/(precision+recall)

In the by-cluster test, a true positive is obtained when the sense chosen by apparatus 10 for a cluster label occurs in at least one of the files within the cluster. A true negative is obtained when none of the senses in the gold standard files which correspond to the files in a cluster are found. A false positive is obtained when the sense chosen by apparatus 10 does not occur in any of the cluster's files.

For each test, two scenarios were performed. Each scenario includes results for three similarity measures: Resnik's, Jiang's and Conrath's, and Lin's.

In the first scenario, the disambiguated cluster label record (Table E) was obtained by selecting the lowest (most common) word sense with the highest similarity score. Results are shown in Tables F and G corresponding to the by-cluster test and the by-file test, respectively. Both in the by-cluster and the by-file tests, the Jiang and Conrath similarity measure significantly outperforms the other two. These results are in keeping with previous findings (Budanitsky and Hirst, 2001). The difference in F-measure between the by-cluster and the by-file tests indicates the increased difficulty of the task. The occurrence of different senses for the same cluster label within each cluster was negligible. This is interpreted as an indication that satisfactory clustering of the SemCor data was performed. Other tests within a less favorable environment may lead to deteriorated results.

TABLE F

|  | Resnik | Lin | Jiang & Conrath |
| --- | --- | --- | --- |
| Precision | 0.664 | 0.681 | 1 |
| Recall | 0.940 | 0.940 | 0.900 |
| F-measure | 0.778 | 0.790 | 0.947 |

TABLE G

|  | Resnik | Lin | Jiang & Conrath |
|---|---|---|---|
| Precision | 0.570 | 0.583 | 0.733 |
| Recall | 0.796 | 0.796 | 0.724 |
| F-measure | 0.664 | 0.673 | 0.729 |

In the second scenario, disambiguated cluster label records were obtained by selecting the word sense with the highest similarity score. Results are shown in Tables H and I for the by-cluster test and the by-file test, respectively. This scenario illustrates that choosing the lowest (most common) word sense number as mentioned above in accordance with at least one aspect improves the disambiguation results.

TABLE H

|  | Resnik | Lin | Jiang & Conrath |
|---|---|---|---|
| Precision | 0.482 | 0.596 | 0.614 |
| Recall | 0.826 | 0.911 | 0.940 |
| F-measure | 0.609 | 0.721 | 0.743 |

TABLE I

|  | Resnik | Lin | Jiang & Conrath |
|---|---|---|---|
| Precision | 0.443 | 0.528 | 0.543 |
| Recall | 0.705 | 0.782 | 0.812 |
| F-measure | 0.544 | 0.630 | 0.651 |

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A document clustering method comprising:
providing a document set comprising a plurality of documents;
providing a cluster comprising a subset of the documents of the document set, wherein the subset comprises a plurality of the documents;
using a plurality of terms of the documents of the cluster which are indicative of subject matter content of the documents of the cluster, selecting a cluster label indicative of the subject matter content of the documents of the cluster, wherein the cluster label is selected at least in part by co-occurrence of the cluster label and the plurality of terms of the documents of the cluster and wherein the cluster label comprises a plurality of word senses; and
selecting one of the word senses of the cluster label having an increased relevancy with respect to the plurality of terms of the documents of the cluster compared with the relevancies of others of the word senses.

2. The method of claim 1 wherein the providing the cluster comprises identifying the documents of the subset using terms occurring in the documents of the subset.

3. The method of claim 2 wherein the selecting the cluster label comprises selecting one of the terms.

4. The method of claim 3 further comprising analyzing the documents of the document set to identify the terms.

5. The method of claim 3 wherein the terms comprise minor terms and major terms, and the cluster label comprises a major term.

6. The method of claim 1 wherein the selecting the one of the word senses comprises determining, for individual ones of the word senses, a plurality of semantic similarity values with respect to the terms, wherein the semantic similarity values are individually indicative of a degree of semantic similarity between one of the word senses and one of the terms.

7. The method of claim 6 wherein the selecting the one of the word senses comprises selecting the one of the word senses having a greatest cumulative semantic similarity with respect to the terms.

8. The method of claim 1 wherein the providing the cluster comprises identifying the documents of the subset using the terms occurring in the documents of the subset and wherein the selecting the one of the word senses comprises determining, for individual ones of the word senses, a plurality of semantic similarity values with respect to individual ones of the terms.

9. The method of claim 8 wherein the selecting the one of the word senses further comprises, for individual ones of the terms, selecting the greatest semantic similarity values for individual ones of the word senses and, for individual ones of the word senses, summing the selected greatest semantic similarity values for the respective word sense providing a cumulative value for the word sense, and selecting the word sense having the greatest cumulative value.

10. The method of claim 9 wherein the determining comprises determining, for individual ones of the word senses, the semantic similarity values with respect to a plurality of word senses of individual ones of the terms of the documents of the cluster.

11. The method of claim 1 further comprising translating the cluster label from a first language to a second language using the selected one of the word senses.

12. A document cluster label disambiguation method comprising:
selecting a cluster label for a cluster comprising a subset of a plurality of documents of a document set at least in part by co-occurrence of the cluster label and a plurality of terms of the documents of the cluster which are indicative of subject matter content of the documents of the cluster, wherein the subset comprises a plurality of the documents and wherein the cluster label comprises one of a plurality of terms common to at least some of the documents of the cluster and the cluster label comprises a plurality of word senses;
determining, for individual ones of the word senses, a plurality of semantic similarity values for respective ones of the terms, wherein the semantic similarity values are individually indicative of a degree of semantic similarity between one of the word senses and one of the terms;
analyzing the semantic similarity values determined for respective ones of the word senses;
selecting one of the word senses using the analyzing; and
wherein the selecting the one of the word senses comprises, using the terms of the documents of the cluster, selecting the one of the word senses having an increased relevancy with respect to the subject matter content of the documents of the cluster compared with the relevancies of others of the word senses.

13. The method of claim 1 wherein the selecting the cluster label comprises selecting the cluster label after the providing the cluster, and wherein the selecting the one of the word senses comprises selecting the one of word senses of the cluster label after the selecting the cluster label comprising the plurality of word senses.

14. The method of claim 1 wherein the documents of the cluster individually comprise a plurality of the terms which individually comprise a word.

15. The method of claim 12 wherein the determining comprises determining, for individual ones of the word senses, a plurality of semantic similarity values with respect to individual ones of the terms.

16. The method of claim 12 wherein the selecting the one of the word senses comprises selecting the one of the word senses having a greatest cumulative semantic similarity with respect to the terms.

17. The method of claim 12 wherein the analyzing comprises, for individual ones of the terms, selecting the greatest semantic similarity values for individual ones of the word senses and, for individual ones of the word senses, summing the selected greatest semantic similarity values for the respective word sense providing a cumulative value for the word sense; and wherein the selecting the one of the word senses comprises selecting the one of the word senses having the greatest cumulative value.

18. The method of claim 12 wherein the terms comprise minor terms and major terms, and the cluster label comprises a major term.

19. The method of claim 12 wherein the providing selecting the cluster label for the cluster comprises selecting the cluster label after identifying the documents of the subset which correspond to the cluster, and wherein the selecting the one of the word senses comprises selecting the one of the word senses after the identifying the documents of the subset which correspond to the cluster.

20. A document clustering apparatus comprising:
processing circuitry configured to access a document set comprising a plurality of documents, to define a cluster comprising a subset of the documents of the document set and wherein the subset comprises a plurality of the documents, to identify a cluster label indicative of subject matter content of at least one of the documents of the cluster at least in part by co-occurrence of the cluster label and a plurality of terms of the documents of the cluster which are indicative of the subject matter content of the documents of the cluster, and to use the terms of the documents of the cluster to disambiguate the cluster label after the identification of the cluster label to increase the relevancy of the cluster label with respect to the subject matter content of the at least one of the documents compared with the cluster label prior to the disambiguation.

21. The apparatus of claim 20 wherein the cluster label comprises a plurality of word senses and the processing circuitry is configured to select one of the word senses to disambiguate the cluster label.

22. The apparatus of claim 21 wherein the processing circuitry is configured to select the one of the word senses having increased relevancy with respect to the subject matter content of the documents of the cluster compared with the relevancies of others of the word senses.

23. The apparatus of claim 21 wherein the processing circuitry is configured to determine, for individual ones of the word senses, a plurality of semantic similarity values with respect to the terms, wherein the semantic similarity values are individually indicative of a degree of semantic similarity between one of the word senses and one of the terms.

24. The apparatus of claim 23 wherein the processing circuitry is configured to select the one of the word senses having a greatest cumulative semantic similarity with respect to the terms.

25. The apparatus of claim 21 wherein the terms comprise minor terms and major terms, and the cluster label comprises a major term.

26. The apparatus of claim 21 wherein the processing circuitry is configured to identify the documents of the subset using the terms occurring in the documents of the subset, and wherein the processing circuitry is configured to determine, for individual ones of the word senses, a plurality of semantic similarity values with respect to the terms to select the one of the word senses.

27. The apparatus of claim 26 wherein the processing circuitry is configured, for individual ones of the terms, to select the greatest semantic similarity values for individual ones of the word senses and, for individual ones of the word senses, to sum the selected greatest semantic similarity values for the respective word sense providing a cumulative value for the word sense, and to select the word sense having the greatest cumulative value to select the one of the word senses.

28. The apparatus of claim 27 wherein the processing circuitry is configured to determine, for individual ones of the word senses, the semantic similarity values with respect to a plurality of word senses of individual ones of the terms.

29. The apparatus of claim 20 wherein the document set is external of the apparatus, and further comprising a communications interface configured to access the document set.

30. The apparatus of claim 20 further comprising a display, and wherein the processing circuitry is configured to control the display to depict the cluster and the selected one of the word senses of the cluster label.

31. The apparatus of claim 20 wherein the processing circuitry is configured to identify the cluster label after the defining of the cluster.

32. The apparatus of claim 20 wherein the documents of the cluster individually comprise a plurality of words.

33. An article of manufacture comprising:
a computer-readable storage medium comprising programming configured to cause processing circuitry to:
select a cluster label for a cluster comprising a subset of a plurality of documents of a document set at least in part by co-occurrence of the cluster label and a plurality of terms of the documents of the cluster which are indicative of subject matter content of the documents of the cluster, wherein the subset comprises a plurality of the documents and wherein the cluster label comprises one of a plurality of terms common to at least one of the documents of the cluster and the cluster label comprises a plurality of word senses;
determine, for individual ones of the word senses, a plurality of semantic similarity values for respective ones of the terms, wherein the semantic similarity values are individually indicative of a degree of semantic similarity between one of the word senses and one of the terms;
analyze the semantic similarity values determined for respective ones of the word senses; and
select one of the word senses using the analysis, wherein the one of the word senses has an increased relevancy with respect to the terms of the documents of the cluster compared with the relevancies of others of the word senses.

34. The article of claim 33 wherein the programming is configured to cause the processing circuitry to determine, for individual ones of the word senses, a plurality of semantic similarity values with respect to individual ones of the terms.

35. The article of claim 33 wherein the programming is configured to cause the processing circuitry to select the one of the word senses having a greatest cumulative semantic similarity with respect to the terms.

36. The article of claim 33 wherein the programming is configured to cause the processing circuitry to, for individual ones of the terms, select the greatest semantic similarity values for individual ones of the word senses and, for individual ones of the word senses, to sum the selected greatest semantic similarity values for the respective word sense providing a cumulative value for the word sense to analyze the semantic similarity values, and to select the one of the word senses having the greatest cumulative value.

37. The article of claim 33 wherein the terms comprise minor terms and major terms, and the cluster label comprises a major term.

38. The article of claim 33 wherein the selected one of the word senses is indicative of contents of the documents of the subset which correspond to the cluster.

39. The article of claim 38 wherein the programming is configured to cause the processing circuitry to control a display to depict the cluster and the selected one of the word senses in a manner which is associated with the cluster.

* * * * *

UNITED STATES PATENT AND TRADEMARK OFFICE
CERTIFICATE OF CORRECTION

PATENT NO. : 7,636,730 B2 Page 1 of 1
APPLICATION NO. : 11/118156
DATED : December 22, 2009
INVENTOR(S) : Sanfilippo et al.

It is certified that error appears in the above-identified patent and that said Letters Patent is hereby corrected as shown below:

Col. 1, line 48, please delete "www.cogsi.princeton-.edu/~wn)" after "at" and insert --http://www.cogsi.princeton.edu/~wn)--.

Col. 15, line 30, claim 19, please delete "providing" after "wherein the".

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,636,730 B2  Page 1 of 1
APPLICATION NO. : 11/118156
DATED : December 22, 2009
INVENTOR(S) : Sanfilippo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this

Ninth Day of November, 2010

David J. Kappos
*Director of the United States Patent and Trademark Office*